(12) United States Patent
Tsubouchi

(10) Patent No.: US 11,769,888 B2
(45) Date of Patent: Sep. 26, 2023

(54) FUEL CELL SYSTEM

(71) Applicant: TOYOTA JIDOSHA KABUSHIKI KAISHA, Toyota (JP)

(72) Inventor: Masakatsu Tsubouchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 32 days.

(21) Appl. No.: 17/464,957

(22) Filed: Sep. 2, 2021

(65) Prior Publication Data

US 2022/0140363 A1 May 5, 2022

(30) Foreign Application Priority Data

Nov. 4, 2020 (JP) .................. 2020-184071

(51) Int. Cl.
*H01M 8/04029* (2016.01)
*H01M 8/04291* (2016.01)

(52) U.S. Cl.
CPC ... *H01M 8/04029* (2013.01); *H01M 8/04291* (2013.01); *H01M 2250/20* (2013.01)

(58) Field of Classification Search
None
See application file for complete search history.

(56) References Cited

U.S. PATENT DOCUMENTS

| | | | | |
|---|---|---|---|---|
| 6,124,052 A | * | 9/2000 | Katoh | B60L 58/33 |
| | | | | 429/408 |
| 7,482,085 B2 | * | 1/2009 | Roberts | H01M 8/04007 |
| | | | | 429/413 |

FOREIGN PATENT DOCUMENTS

| | | |
|---|---|---|
| JP | 55-127174 U | 9/1980 |
| JP | 2004288491 A | 10/2004 |
| JP | 2020064882 A | 4/2020 |

* cited by examiner

*Primary Examiner* — Alix E Eggerding
(74) *Attorney, Agent, or Firm* — Dickinson Wright, PLLC

(57) ABSTRACT

A fuel cell system includes a fuel cell stack and a storage tank in which at least part of generated water discharged from the fuel cell stack is stored in liquid form. The storage tank includes a first valve configured to adjust the pressure inside the storage tank to a pressure equal to or lower than a predetermined pressure that is higher than the pressure outside the storage tank.

4 Claims, 2 Drawing Sheets

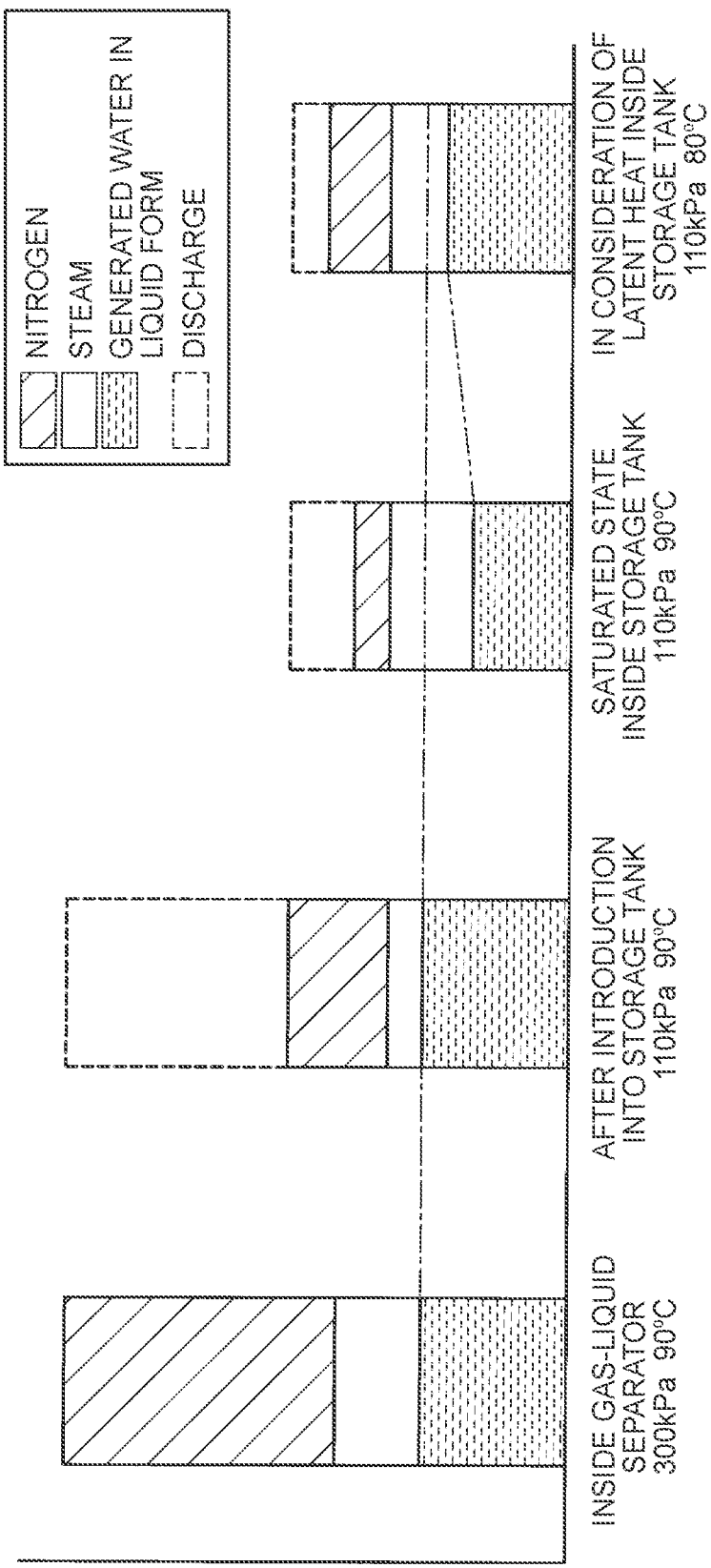

FUEL CELL SYSTEM

CROSS-REFERENCE TO RELATED APPLICATION

This application claims priority to Japanese Patent Application No. 2020-184071 filed on Nov. 4, 2020, incorporated herein by reference in its entirety.

BACKGROUND

1. Technical Field

This disclosure relates to a fuel cell system.

2. Description of Related Art

It is generally known that water is generated by power generation in fuel cell systems. A fuel cell system described in Japanese Unexamined Patent Application Publication No. 2020-64882 (JP 2020-64882 A) includes a tank in which water is stored, the water being liquid obtained by cooling steam included in gas discharged from a fuel cell stack. In JP 2020-64882 A, the water in the tank is used as refrigerant.

SUMMARY

When water generated by power generation is kept in liquid form, the water can be used for various purposes. Further, in a case where the water is kept in liquid form, the water can be stored with a volume smaller than that in a case where the water is kept in gaseous form. However, a cooling device for cooling and liquefying steam discharged from a fuel cell stack requires a large space for the cooling device to be arranged. On this account, a technology by which water discharged from a fuel cell stack can be stored in liquid form without the use of a cooling device is demanded.

This disclosure has been accomplished in order to solve the above problem and can be achieved in the following aspects.

(1) One aspect of this disclosure provides a fuel cell system. The fuel cell system includes a fuel cell stack, and a storage tank. In the storage tank, at least part of generated water discharged from the fuel cell stack is stored in liquid form. The storage tank includes a first valve configured to adjust the pressure inside the storage tank to a pressure equal to or lower than a predetermined pressure that is higher than the pressure outside the storage tank.

In such an aspect, in the storage tank having a pressure higher than the pressure outside the storage tank, water having a temperature at which the water turns into steam outside the storage tank can be present in a liquid state. On this account, the water discharged from the fuel cell stack can be stored with the water being kept in liquid form without the use of a cooling device.

(2) In the fuel cell according to the above aspect, the predetermined pressure may be a pressure at which at least part of the generated water inside the storage tank is kept in liquid form in an expected temperature range in the storage tank.

In such an aspect, the generated water is kept in liquid form inside the storage tank. On this account, the water discharged from the fuel cell stack can be stored with the water being kept in liquid form without the use of a cooling device.

(3) In the fuel cell according to the above aspect, the storage tank may include a second valve configured to introduce external air into the storage tank when the pressure inside the storage tank is lower than the pressure outside the storage tank.

In such an aspect, it is possible to restrain such a situation that the storage tank deforms due to the pressure inside the storage tank becoming largely lower than the pressure outside the storage tank.

(4) In the fuel cell according to the above aspect, the storage tank may include a heat transfer member provided inside the storage tank, the heat transfer member being configured to float on the water surface of the generated water and having a heat conductivity higher than a heat conductivity of the generated water.

In such an aspect, when the first valve is opened and the generated water in liquid form on the heat transfer member evaporates, the storage tank can transfer, by means of the heat transfer member, latent heat of the evaporation to the generated water in liquid form, the generated water being placed below the heat transfer member. Accordingly, it is possible to promote a decrease in the temperature of the generated water in liquid form, the generated water being placed below the heat transfer member. Accordingly, it is possible to restrain evaporation of the generated water inside the storage tank. Further, the heat transfer member covers at least part of the surface of the water in liquid form inside the storage tank. This also makes it possible to restrain evaporation of water from the surface of the water in liquid form inside the storage tank.

(5) The fuel cell according to the above aspect may further include: a cooling system configured to cool the fuel cell stack by coolant; and a feeder configured to send out the generated water inside the storage tank to the cooling system as the coolant.

In such an aspect, the generated water can be utilized as the coolant for the cooling system.

Note that this disclosure can be achieved in various aspects. For example, this disclosure is achievable in aspects such as a tank in which generated water of a fuel cell stack is stored, a power generator including a fuel cell system, and a vehicle including a fuel cell system.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a schematic diagram illustrating a relationship between the amount of nitrogen, the state of water, and the amount of water in a storage tank.

DETAILED DESCRIPTION OF EMBODIMENTS

A. First Embodiment

Figure 1:
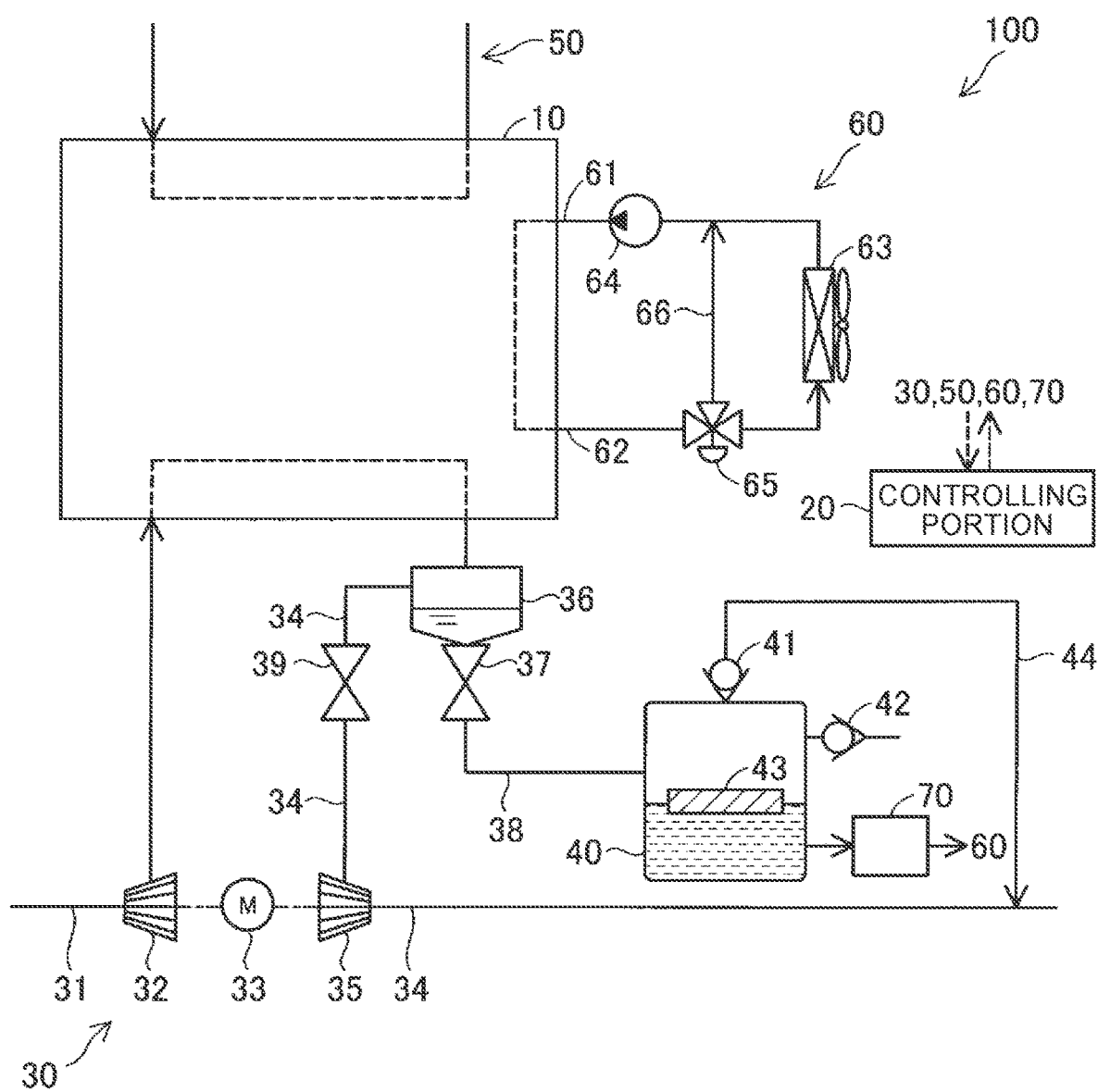
FIG. 1 is a view illustrating a schematic configuration of a fuel cell system.

FIG. 1 is a view illustrating a schematic configuration of a fuel cell system 100 according to one embodiment of this disclosure. The fuel cell system 100 includes a fuel cell stack 10, a controlling portion 20, a cathode gas supply-discharge system 30, an anode gas supply-discharge system 50, a cooling system 60, and a feeder 70. The fuel cell system 100 according to the present embodiment is provided in a fuel cell vehicle, for example.

The fuel cell stack 10 is a solid polymer fuel cell configured to generate electric power upon receipt of anode gas (e.g., hydrogen) and cathode gas (e.g., air) as reactant gases. The fuel cell stack 10 is configured such that a plurality of cells (not illustrated) is stacked.

The controlling portion 20 is configured as a computer including a CPU, a memory, and an interface circuit to which each part (described later) is connected. The controlling portion 20 outputs signals to control activation and stop of each device in the fuel cell stack 10 in response to an instruction from an electronic control unit (ECU). The controlling portion 20 controls power generation by the fuel cell system 100 by executing programs stored in the memory. Note that, in the controlling portion 20, some or all of these controls may be implemented as a hardware circuit.

The cathode gas supply-discharge system 30 supplies cathode gas to the fuel cell stack 10 and discharges the cathode gas from the fuel cell stack 10. The cathode gas supply-discharge system 30 includes a cathode gas pipe 31, a compressor 32, a motor 33, an expander 35, a cathode offgas pipe 34, a gas-liquid separator 36, a water discharge valve 37, a water discharge pipe 38, a gas discharge valve 39, and a storage tank 40.

The cathode gas pipe 31 is connected to the fuel cell stack 10, so that air taken into the cathode gas pipe 31 from outside is supplied to the fuel cell stack 10.

The compressor 32 is placed on the upstream side of the cathode gas pipe 31. The compressor 32 takes in air in atmosphere from an intake side, pressurizes the air in the compressor 32, and supplies the air thus pressurized to the cathode gas pipe 31 from a discharge side. The air taken in from the intake side of the compressor 32 is pressurized and discharged from the discharge side of the compressor 32. The compressor 32 is a centrifugal compressor, for example. Note that the compressor 32 is an axial-flow compressor.

The motor 33 is an electric machine configured to drive the compressor 32. The cathode offgas pipe 34 discharges cathode offgas discharged from the fuel cell stack 10 to outside the fuel cell system 100 via the expander 35.

The expander 35 is placed in the cathode offgas pipe 34. The expander 35 assists driving of the compressor 32 by the motor 33. The expander 35 drives the compressor 32 by the air flowing into the expander 35 from an intake side of the expander 35. More specifically, the expander 35 assists driving of the motor 33 to rotate a wheel of the compressor 32, by rotation of a wheel of the expander 35. The air that rotates the wheel of the expander 35 is discharged from a discharge side of the expander 35.

The gas-liquid separator 36 is provided between the fuel cell stack 10 and the expander 35 in the cathode offgas pipe 34. The gas-liquid separator 36 separates, from gas discharged from the fuel cell stack 10, at least part of generated water included in the gas. In the present embodiment, the "generated water" is a concept including water in a gaseous state and water in a liquid state.

The water discharge valve 37 is provided in a lower part of the gas-liquid separator 36. The water discharge valve 37 controls circulation of generated water in liquid form through the water discharge pipe 38, the generate water being stored in the gas-liquid separator 36. The generated water in liquid form is discharged from the gas-liquid separator 36 via the water discharge valve 37 and stored in the storage tank 40. The water discharge pipe 38 connects the gas-liquid separator 36 to the storage tank 40.

The gas discharge valve 39 is provided between the gas-liquid separator 36 and the expander 35 in the cathode offgas pipe 34. The gas discharge valve 39 controls circulation, through the cathode offgas pipe 34, of unnecessary gas in the gas-liquid separator 36. The unnecessary gas is mainly nitrogen gas. The unnecessary gas discharged by the gas discharge valve 39 is discharged to the cathode offgas pipe 34 via the expander 35 and then discharged to outside through the cathode offgas pipe 34. During the operation of the fuel cell system 100, the water discharge valve 37 and the gas discharge valve 39 are closed generally and are opened in response to respective control signals from the controlling portion 20.

The storage tank 40 is a container in which at least part of the generated water discharged from the gas-liquid separator 36 is stored in liquid form. The storage tank 40 includes a first valve 41, a second valve 42, a heat transfer member 43, and a gas discharge pipe 44. Note that the second valve 42 and the heat transfer member 43 may be omitted.

The first valve 41 is a valve configured to control gas inside the storage tank 40 such that the gas circulates through the gas discharge pipe 44 so that the pressure inside the storage tank 40 becomes a pressure equal to or lower than a predetermined pressure that is higher than the pressure outside the storage tank 40. The predetermined pressure is a pressure at which at least part of the generated water inside the storage tank 40 can be kept in liquid form in an expected temperature range in the storage tank 40, for example. That is, the predetermined pressure is a pressure higher than a saturated steam pressure. The expected temperature in the storage tank 40 is equal to or lower than the temperature of the fuel cell stack 10 but higher than the outside temperature, for example. The first valve 41 is configured to be closed when the pressure inside the storage tank 40 increases to the predetermined pressure. The gas discharge pipe 44 discharges gas to outside the storage tank 40. In the present embodiment, the gas discharge pipe 44 joins to the downstream side of the cathode offgas pipe 34.

The second valve 42 is a valve via which external air is introduced into the storage tank 40 when the pressure inside the storage tank 40 is lower than an atmospheric pressure that is the pressure outside the storage tank 40. The second valve 42 is configured to be opened when the pressure inside the storage tank 40 decreases to a predetermined threshold pressure. The threshold pressure is a pressure lower than the pressure outside the storage tank 40, for example.

The heat transfer member 43 is a member floating on the water surface of the generated water in liquid form and having a heat conductivity higher than that of the generated water in liquid form. The heat transfer member 43 is foam metal such as aluminum having closed cells, for example. The specific gravity of the whole heat transfer member 43 is smaller than that of water, so that the heat transfer member 43 floats on the water surface of the generated water in liquid form. The heat transfer member 43 is placed to cover 90% of the liquid surface of the generated water in liquid form inside the storage tank 40 and is exposed on the liquid surface of the generated water in liquid form.

The anode gas supply-discharge system 50 supplies anode gas to the fuel cell stack 10 and discharges the anode gas from the fuel cell stack 10.

The cooling system 60 adjusts the temperature of the fuel cell stack 10 by circulating refrigerant via the fuel cell stack 10. The cooling system 60 includes a refrigerant supply pipe 61, a refrigerant discharge pipe 62, a radiator 63, a refrigerant pump 64, a three-way valve 65, and a bypass pipe 66. As the refrigerant, water, unfreezable water containing ethylene glycol or the like, and so on can be used, for example.

The refrigerant supply pipe 61 is connected to a refrigerant inlet inside the fuel cell stack 10, and the refrigerant discharge pipe 62 is connected to a refrigerant outlet of the fuel cell stack 10. The radiator 63 is connected to the refrigerant discharge pipe 62 and the refrigerant supply pipe 61. The radiator 63 cools the refrigerant flowing therein from the refrigerant discharge pipe 62 by air blow of an electric fan, or the like, and discharges the refrigerant to the refrigerant supply pipe 61. The refrigerant pump 64 is provided in the refrigerant supply pipe 61 and pumps the refrigerant to the fuel cell stack 10. The three-way valve 65 adjusts respective supply amounts of the refrigerant to the radiator 63 and the bypass pipe 66.

The feeder 70 is connected to a supply port provided in a lower part of the storage tank 40 and the cooling system 60. The feeder 70 sends out the generated water in liquid form inside the storage tank 40 to the cooling system 60 as coolant. The feeder 70 is a pump, for example. In a case where the pressure inside the cooling system 60 is lower than the pressure inside the storage tank 40, it is preferable that the feeder 70 send out the generated water in liquid form inside the storage tank 40 to the cooling system 60 as the coolant after the temperature of the generated water in liquid form inside the storage tank 40 decreases to be equal to or lower than a predetermined temperature. Hereby, the generated water inside the storage tank 40 can be supplied to the cooling system 60 with the generated water being kept in liquid form.

FIG. 2 is a schematic diagram illustrating a relationship between the amount of nitrogen, the state of water, and the amount of water inside the storage tank in the present embodiment. This does not illustrate a mass ratio of gas to generated water in liquid form. The vertical axis indicates respective amounts of substances, and in terms of nitrogen and steam, their partial pressures are illustrated. That is, the vertical axis indicates the amount of each gas that can be present in gaseous form. The leftmost bar graph illustrates a state in the gas-liquid separator 36. Three bar graphs from the right side illustrates states in the storage tank 40. The second bar graph from the left side illustrates a state right after gas and water are discharged from the gas-liquid separator 36. The third bar graph from the left side illustrates a saturated state. The saturated state is a state where a balanced state is established between water and steam. The rightmost bar graph illustrates a state in consideration of latent heat.

In the state inside the gas-liquid separator 36, corresponding to the leftmost bar graph, the pressure is about 300 kPa, and the temperature is about 90° C., for example. In the state inside the storage tank 40, corresponding to the second bar graph from the left side, the pressure is about 110 kPa, and the temperature is 90° C., for example. Since the gas and the water are discharged from the gas-liquid separator 36, nitrogen is also discharged to outside, and steam is also discharged to outside. On this account, as illustrated in the second bar graph from the left side, the amount of the steam slightly decreases in addition to the amount of the nitrogen. Lost gas due to the discharge of the gas from the gas-liquid separator 36 is indicated by a broken line on the second bar graph from the left side.

In the state inside the storage tank 40, corresponding to the third bar graph from the left side, the pressure is about 110 kPa, and the temperature inside the storage tank 40 is 90° C., for example. In the course of adjusting the pressure inside the storage tank 40, the first valve 41 is opened, so that gas inside the storage tank 40 is discharged, and evaporation of the generated water in liquid form, stored in the storage tank 40, is promoted. On this account, as indicated by an alternate long and short dash line, the amount of the generated water in liquid form decreases from the amount of the generated water in liquid form on the second bar graph from the left side. Since the nitrogen has a specific gravity smaller than that of the steam, the nitrogen is more easily discharged to outside the storage tank 40 than the steam. On this account, the proportion of the steam inside the storage tank 40 increases, so that the storage tank 40 is brought into a saturated state is in a short time. This accordingly makes it possible to restrain the steam from being discharged to outside.

In the state inside the storage tank 40, corresponding to the rightmost bar graph, the pressure is about 110 kPa, and the temperature inside the storage tank 40 is 80° C., for example. Since evaporation heat is taken away when the generated water in liquid form evaporates, the temperature inside the storage tank 40 decreases. On that account, the saturation vapor pressure decreases, so that it is possible to restrain the generated water in liquid form from evaporating. Further, since the heat transfer member 43 promotes a decrease in the temperature of the generated water in liquid form due to evaporation heat, it is possible to further restrain the generated water in liquid form from evaporating. As a result, as indicated by an alternate long and short dash line, the amount of the generated water in liquid form is smaller than the amount of the generated water in liquid form on the second bar graph from the left side, but as indicated by an alternate long and two short dashes line, the amount of the generated water in liquid form is larger than the amount of the generated water in liquid form on the third bar graph from the left side.

With the fuel cell system 100 according to the present embodiment described above, the pressure inside the storage tank 40 is adjusted by the first valve 41 to be the pressure equal to or lower than the predetermined pressure that is higher than the pressure outside the storage tank 40. This makes it possible to restrain evaporation of the generated water in liquid form inside the storage tank 40. On this account, in the storage tank having a pressure higher than the pressure outside the storage tank, water having a temperature at which the water turns into steam outside the storage tank can be present in a liquid state. Accordingly, the water discharged from the fuel cell stack 10 can be stored with the water being kept in liquid form without the use of a cooling device.

Further, due to the first valve 41, the pressure inside the storage tank 40 becomes a pressure equal to or lower than a pressure at which at least part of the generated water inside the storage tank 40 can be kept in liquid form in an expected temperature range in the storage tank 40. On that account, the generated water is kept in liquid form inside the storage tank 40. Accordingly, the water discharged from the fuel cell stack 10 can be stored with the water being kept in liquid form without the use of a cooling device.

Further, due to the second valve 42, the external air can be introduced into the storage tank 40 when the pressure inside the storage tank is lower than the pressure outside the storage tank 40. On this account, without increasing withstand pressure performance of the storage tank 40 more than required, it is possible to restrain such a situation that the storage tank 40 deforms due to the pressure inside the storage tank 40 becoming largely lower than the pressure outside the storage tank 40.

Further, the heat transfer member 43 is provided inside the storage tank 40. Accordingly, when the first valve 41 is opened and the generated water in liquid form on the heat transfer member 43 evaporates, the storage tank 40 can transfer, by means of the heat transfer member 43, latent heat of the evaporation to the generated water in liquid form, the generated water being placed below the heat transfer member 43. Accordingly, it is possible to promote a decrease in the temperature of the generated water in liquid form, the generated water being placed below the heat transfer member 43. Further, the heat transfer member 43 is placed so as to cover at least part of the liquid surface of the generated water in liquid form. Accordingly, it is possible to restrain evaporation of water from the surface of the generated water in liquid form inside the storage tank 40.

Further, the fuel cell system 100 includes the feeder 70 configured to send out the generated water in liquid form inside the storage tank 40 to the cooling system 60 as the coolant. On that account, the generated water in liquid form can be utilized as the coolant for the cooling system 60.

B. Other Embodiments (B1) In the above embodiment, the fuel cell system 100 includes the storage tank 40 in the cathode gas supply-discharge system 30. However, the present disclosure is not limited to this, and the fuel cell system 100 may include the storage tank 40 in the anode gas supply-discharge system 50.

(B2) In the above embodiment, the fuel cell system 100 supplies the generated water in liquid form inside the storage tank 40 to the cooling system 60 as the coolant. Alternatively, the fuel cell system 100 may discharge the generated water in liquid form inside the storage tank 40 to outside the fuel cell system 100 through the cathode offgas pipe 34. In a case where the temperature of the generated water in liquid form inside the storage tank 40 becomes a predetermined temperature or lower, the fuel cell system 100 discharges the generated water to outside, for example. With this configuration, it is possible to restrain such a situation that the generated water in liquid form inside the storage tank 40, discharged to outside the fuel cell system 100, turns into steam and forms white mist.

(B3) In the above embodiment, the second valve 42 is configured to be opened when the pressure inside the storage tank 40 decreases to a predetermined pressure. Alternatively, the second valve 42 may be configured to be opened when a difference between the pressure inside the storage tank 40 and the pressure outside the storage tank 40 becomes a predetermined pressure or more.

This disclosure is not limited to the above embodiments and is achievable in various configurations within a range that does not deviate from the gist of the disclosure. For example, technical features of the embodiments, corresponding to the technical features of the aspects described in SUMMARY, can be replaced or combined appropriately, in order to solve the problem described above or in order to achieve some or all of the above effects. Further, the technical features can be deleted appropriately if the technical features have not been described as essential in the present specification.

What is claimed is:

1. A fuel cell system comprising:
a fuel cell stack;
a storage tank in which at least part of generated water discharged from the fuel cell stack is stored in liquid form, wherein the storage tank includes a first valve configured to adjust a pressure inside the storage tank to a pressure equal to or lower than a predetermined pressure that is higher than a pressure outside the storage tank; and
a second valve configured to introduce external air into the storage tank when the pressure inside the storage tank is lower than the pressure outside the storage tank.

2. The fuel cell system according to claim 1, wherein the predetermined pressure is a pressure at which at least part of the generated water inside the storage tank is kept in liquid form in an expected temperature range in the storage tank.

3. The fuel cell system according to claim 1, further comprising:
a cooling system configured to cool the fuel cell stack by coolant; and
a feeder configured to send out the generated water inside the storage tank to the cooling system as the coolant.

4. A fuel cell system comprising:
a fuel cell stack; and
a storage tank in which at least part of generated water discharged from the fuel cell stack is stored in liquid form, wherein the storage tank includes a first valve configured to adjust a pressure inside the storage tank to a pressure equal to or lower than a predetermined pressure that is higher than a pressure outside the storage tank;
wherein the storage tank includes a heat transfer member provided inside the storage tank, the heat transfer member being configured to float on a water surface of the generated water and having a heat conductivity higher than a heat conductivity of the generated water.

* * * * *